US012742394B2

(12) United States Patent
Matsuo et al.

(10) Patent No.: US 12,742,394 B2
(45) Date of Patent: Sep. 22, 2026

(54) STATOR BLADE AND GAS TURBINE PROVIDED WITH SAME

(71) Applicant: MITSUBISHI HEAVY INDUSTRIES, LTD., Tokyo (JP)

(72) Inventors: Saki Matsuo, Tokyo (JP); Yasuo Miyahisa, Tokyo (JP); Shunsuke Torii, Tokyo (JP); Satoshi Mizukami, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/873,138

(22) PCT Filed: Jun. 1, 2023

(86) PCT No.: PCT/JP2023/020477
§ 371 (c)(1),
(2) Date: Dec. 9, 2024

(87) PCT Pub. No.: WO2024/004509
PCT Pub. Date: Jan. 4, 2024

(65) Prior Publication Data

US 2025/0361811 A1 Nov. 27, 2025

(30) Foreign Application Priority Data

Jun. 30, 2022 (JP) ................................ 2022-105877

(51) Int. Cl.
*F01D 5/18* (2006.01)
*F01D 9/04* (2006.01)

(52) U.S. Cl.
CPC ............ *F01D 5/187* (2013.01); *F01D 5/186* (2013.01); *F01D 9/041* (2013.01); *F05D 2240/122* (2013.01); *F05D 2260/20* (2013.01)

(58) Field of Classification Search
CPC .......... F01D 5/187; F01D 5/186; F01D 9/041; F05D 2240/122; F05D 2260/20
See application file for complete search history.

(56) References Cited

U.S. PATENT DOCUMENTS 3,628,885 A * 12/1971 Sidenstick ................ F01D 5/20
416/193 A
4,292,008 A * 9/1981 Grosjean .................. F02C 7/18
415/115

(Continued)

FOREIGN PATENT DOCUMENTS

JP 8-270402 10/1996
JP 8-319852 12/1996

(Continued)

OTHER PUBLICATIONS

International Search Report issued Aug. 22, 2023 in International Application No. PCT/JP2023/020477, with English-language translation.

(Continued)

*Primary Examiner* — Brian Christopher Delrue
(74) *Attorney, Agent, or Firm* — Wenderoth, Lind & Ponack, L.L.P.

(57) ABSTRACT

Rear end air passages have a trailing edge opening extending to the trailing edge from a rear blade air passage on the side of the trailing edge among the plurality of blade air passages, and opens at the trailing edge. A first side region includes an end on the blade height first side on the trailing edge extending in the blade height direction not including an end on the blade height second side. A second side region is separated from the first side region on the trailing edge to the blade height second side and includes an end on the blade height second side. An opening area per unit length of the trailing edge in the blade height direction of the trailing edge (Continued)

opening is defined as the aperture ratio. The aperture ratio of the trailing edge opening is higher for the first side region than the second side region.

7 Claims, 4 Drawing Sheets

(56) References Cited

U.S. PATENT DOCUMENTS

| | | | | | |
|---|---|---|---|---|---|
| 5,174,105 | A * | 12/1992 | Hines | F02C 3/10 | 60/774 |
| 5,488,825 | A * | 2/1996 | Davis | F01D 5/187 | 415/115 |
| 5,498,126 | A * | 3/1996 | Pighetti | F01D 9/065 | 415/115 |
| 5,827,043 | A * | 10/1998 | Fukuda | F01D 5/187 | 415/121.2 |
| 6,227,798 | B1 * | 5/2001 | Demers | F01D 9/041 | 416/232 |
| 6,619,912 | B2 * | 9/2003 | Tiemann | F01D 25/12 | 29/889.7 |
| 7,040,097 | B2 * | 5/2006 | Mukherjee | F01D 5/186 | 60/775 |
| 8,777,570 | B1 * | 7/2014 | Liang | F01D 5/187 | 416/193 A |
| 10,385,727 | B2 * | 8/2019 | Dutta | F01D 9/041 | |
| 10,436,049 | B2 * | 10/2019 | Propheter-Hinckley | F01D 5/189 | |
| 10,648,351 | B2 * | 5/2020 | Spangler | F02C 7/141 | |
| 10,669,887 | B2 * | 6/2020 | Allwood | F01D 5/187 | |
| 10,837,293 | B2 * | 11/2020 | Craig, III | B22F 5/04 | |
| 11,111,823 | B2 * | 9/2021 | Jarrossay | F01D 11/005 | |
| 11,131,212 | B2 * | 9/2021 | Spangler | F01D 25/12 | |
| 11,187,092 | B2 * | 11/2021 | McMahon | F01D 9/065 | |
| 11,215,059 | B1 * | 1/2022 | Quach | F01D 5/284 | |
| 2008/0112791 | A1 * | 5/2008 | Lee | F02C 7/12 | 415/58.4 |
| 2010/0000219 | A1 * | 1/2010 | Snook | F02C 6/08 | 60/770 |
| 2013/0251508 | A1 * | 9/2013 | Tardif | F01D 5/187 | 415/115 |
| 2014/0047843 | A1 * | 2/2014 | Papple | F01D 9/023 | 60/726 |
| 2016/0194980 | A1 * | 7/2016 | Thomen | F02C 7/12 | 415/115 |
| 2017/0002671 | A1 * | 1/2017 | Waite | F01D 9/02 | |
| 2019/0249557 | A1 * | 8/2019 | Allwood | F01D 9/065 | |
| 2020/0024966 | A1 * | 1/2020 | Craig, III | F01D 5/187 | |
| 2020/0149401 | A1 * | 5/2020 | Propheter-Hinckley | F01D 5/18 | |
| 2020/0190989 | A1 * | 6/2020 | Fujii | F01D 5/189 | |
| 2020/0190995 | A1 * | 6/2020 | Perron | F01D 9/041 | |
| 2020/0362711 | A1 * | 11/2020 | McMahon | F01D 9/065 | |
| 2020/0386103 | A1 * | 12/2020 | Generale | F01D 5/186 | |
| 2020/0400031 | A1 * | 12/2020 | Joo | F01D 9/065 | |
| 2021/0123349 | A1 | 4/2021 | Tsuji et al. | | |
| 2021/0231022 | A1 * | 7/2021 | Whittle | F01D 5/284 | |
| 2023/0304412 | A1 * | 9/2023 | Preuss | F01D 5/18 | |
| 2023/0374908 | A1 * | 11/2023 | Preuss | F01D 9/065 | |
| 2023/0383661 | A1 * | 11/2023 | Matsuo | F01D 9/065 | |

FOREIGN PATENT DOCUMENTS

| | | | |
|---|---|---|---|
| JP | 2001-248403 | 9/2001 | |
| JP | 2019-15252 | 1/2019 | |
| WO | WO-2009118245 A1 * | 10/2009 | F01D 5/187 |
| WO | WO-2012137898 A1 * | 10/2012 | F01D 5/186 |

OTHER PUBLICATIONS

Written Opinion of the International Searching Authority issued Aug. 22, 2023 in corresponding International (PCT) Patent Application No. PCT/JP2023/020477, with English-language translation.

* cited by examiner

STATOR BLADE AND GAS TURBINE PROVIDED WITH SAME

TECHNICAL FIELD

The present invention relates to a stator blade and a gas turbine provided with the same.

Priority is claimed on Japanese Patent Application No. 2022-105877, filed on Jun. 30, 2022, the content of which is incorporated herein by reference.

BACKGROUND ART

A gas turbine includes a compressor that compresses air to generate compressed air, a combustor that combusts a fuel in the compressed air to generate a combustion gas, and a turbine driven by the combustion gas. The turbine includes a turbine rotor that rotates around an axis, a turbine casing that covers the rotor, and a plurality of stator blade rows. The turbine rotor includes a rotor shaft around the axis, and a plurality of rotor blade rows attached to the rotor shaft. The plurality of rotor blade rows are aligned in an axial direction where the axis extends. Each of the rotor blade rows includes a plurality of rotor blades aligned in a circumferential direction with respect to the axis. The plurality of stator blade rows are aligned in the axial direction, and are attached to an inner peripheral side of the turbine casing. Each of the plurality of stator blade rows is disposed on an axial upstream side of any one rotor blade row in the plurality of rotor blade rows. Each of the stator blade rows includes a plurality of stator blades aligned in the circumferential direction with respect to the axis.

The stator blade includes a blade body having a blade shape whose cross-section is perpendicular to a radial direction with respect to the axis and extending in the radial direction, an inner shroud provided on a radial inner side of the blade body, and an outer shroud provided on a radial outer side of the blade body. The blade body of the stator blade is disposed inside a combustion gas flow path through which the combustion gas passes. The inner shroud defines an edge on the radial inner side of the combustion gas flow path. The outer shroud defines an edge on the radial outer side of the combustion gas flow path.

The stator blade of the gas turbine is exposed to a high-temperature combustion gas. Therefore, the stator blade is generally cooled by air or the like.

For example, in a blade body of a stator blade disclosed in Japanese Unexamined Patent Application Publication No. H8-319852, a plurality of blade air passages and a plurality of trailing edge air passages through which cooling air can be circulated are formed. All of the plurality of blade air passages extend in the radial direction. The plurality of blade air passages are aligned from a side of a leading edge to a side of a trailing edge side of the blade body. In a front blade air passage which is the blade air passage on a side closest to the leading edge in the plurality of blade air passages, an end of the radial outer side of the front blade air passage forms an inlet opening. A rear cooling passage which is the blade air passage adjacent to the side of the trailing edge with respect to the front blade air passage in the plurality of blade air passages communicates with the front blade air passage in a portion on the mutual radial inner side. The plurality of trailing edge air passages are aligned in the radial direction. All of the plurality of trailing edge air passages extend from the rear blade air passage toward the trailing edge, and are open in the trailing edges.

With regard to the stator blade of the gas turbine, it is desirable to cool the stator blade and suppress a usage amount of air for cooling the stator blade while durability of the stator blade is improved.

Therefore, an object of the present disclosure is to provide a stator blade effectively cooled with cooling air, which can suppress a usage amount of the cooling air while improved durability is achieved, and a gas turbine provided with the stator blade.

SUMMARY OF THE INVENTION

According to one aspect of the invention for achieving the object, there is provided a stator blade in a gas turbine. The stator blade includes a blade body having a blade shape in a cross section and extending in a blade height direction having a direction component perpendicular to the cross section, an outer shroud provided on a blade height first side out of the blade height first side and a blade height second side of the blade body in a blade height direction, and configured to be attached to a turbine casing, a plurality of blade air passages extending in the blade height direction inside the blade body, and a plurality of rear end air passages aligned in the blade height direction.

The blade body has a leading edge and a trailing edge which extend in the blade height direction. The plurality of blade air passages are aligned from a side of the leading edge toward a side of the trailing edge. A front blade air passage which is the blade air passage on a side closest to the leading edge in the plurality of blade air passages has an inlet opening into which cooling air is configured to flow, in an end of the blade height first side of the front blade air passage. In the plurality of blade air passages, the blade air passages adjacent to each other in the plurality of blade air passages communicate with each other in one end out of an end of the blade height first side and an end of the blade height second side such that a passage forms one serpentine passage meandering in the blade height direction. The plurality of rear end air passages have the trailing edge opening extending toward the trailing edge from the rear blade air passage which is the blade air passage on the side closest to the trailing edge in the plurality of blade air passages, and which is open in the trailing edge. A region including an end of the blade height first side and not including an end of the blade height second side in the trailing edge extending in the blade height direction is defined as a first side region. A region separated from the first side region to the blade height second side in the trailing edge and including an end of the blade height second side is defined as a second side region. An opening area of the trailing edge opening in the plurality of rear end air passages per unit length of the trailing edge in the blade height direction is defined as an opening ratio. In this case, the opening ratio of the trailing edge opening in the plurality of rear end air passages is higher in the first side region than in the second side region.

In recent years, in order to improve performance of the gas turbine, a method for increasing the blade height of the blade body, that is, a method for increasing the length of the blade body in the radial direction has been studied. When the length of the blade body in the radial direction increases, a force received by the blade body from the combustion gas increases, and a moment in which an end of the radial inner side of the blade body tends to turn to the axial downstream side around an end of the radial outer side of the blade body increases. When the moment increases in this way, it is necessary to increase strength of a portion on the radial outer side around the trailing edge of the blade body. On the other hand, even when the moment increases, the portion on the radial inner side of the blade body is located on a side of a free end of the stator blade. Therefore, it is not necessary to increase the strength of this portion.

Therefore, in the present aspect, the opening ratio of the second side region is decreased to suppress a usage amount of the cooling air. In contrast, the opening ratio of the first side region is increased to improve cooling performance of the first side region. In this manner, degradation of the strength around the first side region is suppressed. Therefore, in the present aspect, the stator blade is effectively cooled, and the usage amount of the cooling air can be suppressed while improved durability of the stator blade can be achieved.

According to one aspect of the invention for achieving the object, there is provided a gas turbine including a turbine rotor rotatable around an axis, a turbine casing that covers an outer peripheral side of the turbine rotor, and a plurality of stator blade rows aligned in an axial direction in which the axis extends, and attached to an inner peripheral side of the turbine casing.

All of the plurality of stator blade rows have a plurality of stator blades aligned in a circumferential direction with respect to the axis. In the plurality of stator blade rows, each of the plurality of stator blades of a final stage stator blade row which is the stator blade row closest to an axial downstream side out of an axial upstream side and the axial downstream side in the axial direction is the stator blade according to the one aspect. Each of the plurality of stator blades of the final stage stator blade row is attached to the turbine casing such that the blade height direction is a radial direction with respect to the axis, the blade height first side is the radial outer side out of the radial inner side and the radial outer side in the radial direction, and a side on which the trailing edge with respect to the leading edge exists is the axial downstream side.

Advantageous Effects of Invention

According to one aspect of the present disclosure, a stator blade is effectively cooled with cooling air, and a usage amount of the cooling air can be suppressed while improved durability of the stator blade can be achieved.

DESCRIPTION OF EMBODIMENTS

Hereinafter, various embodiments of the present invention and modification examples thereof will be described in detail with reference to the drawings.

[Embodiment of Gas Turbine]

An embodiment of a gas turbine will be described with reference to FIGS. 1 and 2.

Figure 1:
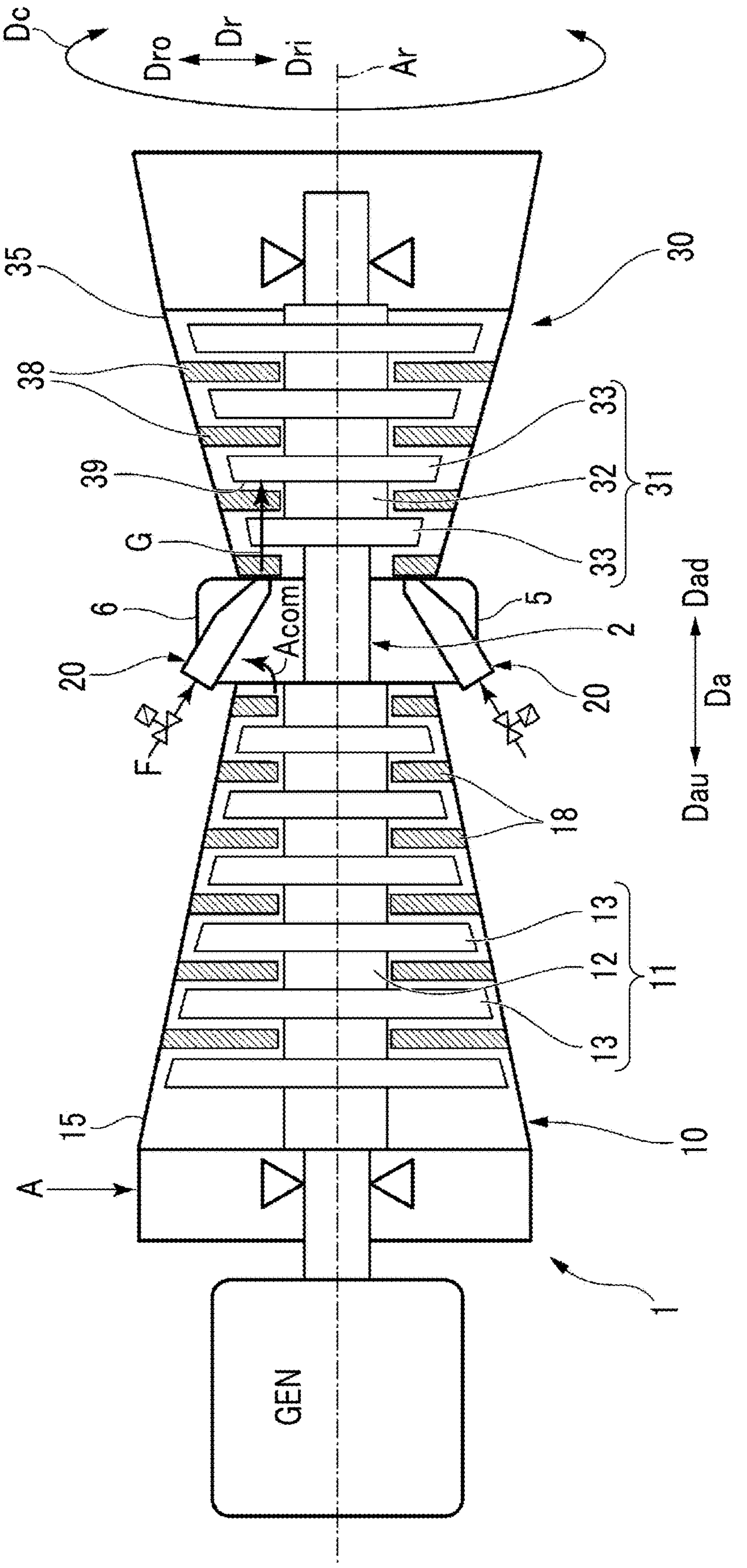
FIG. 1 is a schematic cross-sectional view of a gas turbine in an embodiment according to the present disclosure.

As illustrated in FIG. 1, a gas turbine 1 in the present embodiment includes a compressor 10 that compresses outside air A to generate compressed air Acom, a combustor 20 that combusts a fuel F from a fuel supply source in the compressed air Acom to generate combustion gas G, and a turbine 30 driven by the combustion gas G.

The compressor 10 includes a compressor rotor 11 that rotates around an axis Ar; a compressor casing 15 that covers the compressor rotor 11; and a plurality of stator blade rows 18. The turbine 30 includes a turbine rotor 31 that rotates around the axis Ar; a turbine casing 35 that covers the turbine rotor 31; and a plurality of stator blade rows 38. Hereinafter, an extending direction of the axis Ar will be referred to as an axial direction Da, a circumferential direction around the axis Ar will be simply referred to as a circumferential direction Dc, and a direction perpendicular to the axis Ar will be referred to as a radial direction Dr. In addition, one side in the axial direction Da will be referred to as an axial upstream side Dau, and a side opposite thereto will be referred to as an axial downstream side Dad. In addition, a side closer to the axis Ar in the radial direction Dr will be referred to as a radial inner side Dri, and a side opposite thereto will be referred to as a radial outer side Dro.

The compressor 10 is disposed on the axial upstream side Dau with respect to the turbine 30.

The compressor rotor 11 and the turbine rotor 31 are located on the same axis Ar, and are connected to each other to form a gas turbine rotor 2. For example, a rotor of a generator GEN is connected to the gas turbine rotor 2. The gas turbine 1 further includes an intermediate casing 6.

The intermediate casing 6 is disposed between the compressor casing 15 and the turbine casing 35 in the axial direction Da. The compressor casing 15, the intermediate casing 6, and the turbine casing 35 are connected to each other to form a gas turbine casing 5.

Figure 2:
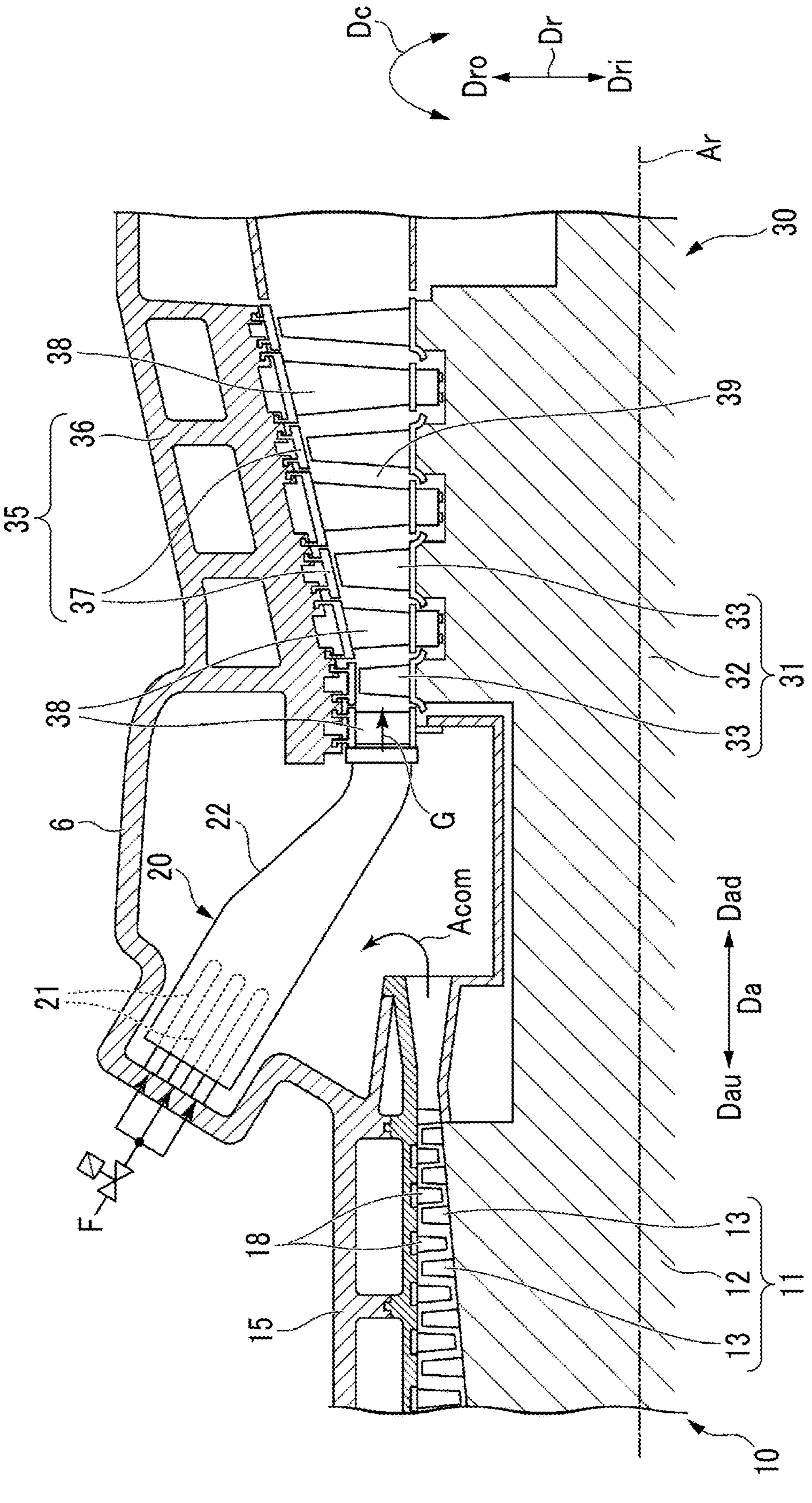
FIG. 2 is a cross-sectional view illustrating a main part of the gas turbine in the embodiment according to the present disclosure.

As illustrated in FIGS. 1 and 2, the compressor rotor 11 includes a rotor shaft 12 extending in the axial direction Da around the axis Ar, and a plurality of rotor blade rows 13 attached to the rotor shaft 12. The plurality of rotor blade rows 13 are aligned in the axial direction Da. Each of the rotor blade rows 13 includes a plurality of rotor blades aligned in the circumferential direction Dc. One stator blade row 18 of the plurality of stator blade rows 18 is disposed on the axial downstream side Dad of each of the plurality of rotor blade rows 13. Each of the stator blade rows 18 is provided inside the compressor casing 15. Each of the stator blade rows 18 includes a plurality of stator blades aligned in the circumferential direction Dc.

The turbine rotor 31 includes a rotor shaft 32 extending in the axial direction Da around the axis Ar, and a plurality of rotor blade rows 33 attached to the rotor shaft 32. The plurality of rotor blade rows 33 are aligned in the axial direction Da. Each of the rotor blade rows 33 includes a plurality of rotor blades aligned in the circumferential direction Dc. One stator blade row 38 of the plurality of stator blade rows 38 is disposed on the axial upstream side Dau of each of the plurality of rotor blade rows 33. Each of the stator blade rows 38 is provided inside the turbine casing 35. Each of the stator blade rows 38 includes a plurality of stator blades aligned in the circumferential direction Dc.

An annular space between an outer peripheral side of the rotor shaft 32 and an inner peripheral side of the turbine casing 35, where the rotor blade row 33 and the stator blade row 38 are disposed in the axial direction Da, forms a combustion gas flow path 39 through which the combustion gas G from the combustor 20 flows.

As illustrated in FIG. 2, the turbine casing 35 includes a turbine casing body 36 and a plurality of ring segments 37. The ring segment 37 is located on the radial outer side Dro of the rotor blade row 33, and faces the rotor blade row 33 in the radial direction Dr. The ring segment 37 defines an edge on the radial outer side Dro of the combustion gas flow path 39 at a position where the rotor blade row 33 exists in the axial direction Da. The turbine casing body 36 has a tubular shape around the axis Ar to surround an outer periphery of the turbine rotor 31. The plurality of stator blade rows 38 and the plurality of ring segments 37 are attached to a portion on an inner peripheral side of the turbine casing body 36.

The combustor 20 is attached to the intermediate casing 6. The combustor 20 includes a transition piece (or combustion tube) 22 in which the fuel F is combusted, and a plurality of burners 21 that inject the fuel into the transition piece 22.

As illustrated in FIG. 1, the compressor 10 compresses the outside air A to generate the compressed air Acom. The compressed air Acom flows into the combustor 20. The fuel F is supplied to the combustor 20. The burner 21 of the combustor 20 injects the compressed air Acom into the transition piece 22 together with the fuel F. Inside the transition piece 22, the fuel F is combusted in the compressed air Acom to generate the high-temperature and high-pressure combustion gas G. The combustion gas G is fed from the transition piece 22 to the combustion gas flow path 39 inside the turbine 30. The combustion gas G rotates the turbine rotor 31 in a process of flowing to the axial downstream side Dad through the combustion gas flow path 39. A rotor of the generator GEN connected to the gas turbine rotor 2 is rotated by rotation of the turbine rotor 31. As a result, the generator GEN generates electricity.

Hereinafter, the stator blades forming the stator blade row 38 on the axial downstream side Dad in the plurality of stator blade rows 38 will be described.

[Embodiment of Stator Blade]

Hereinafter, an embodiment of the stator blade will be described with reference to FIGS. 3 and 4.

Figure 3:
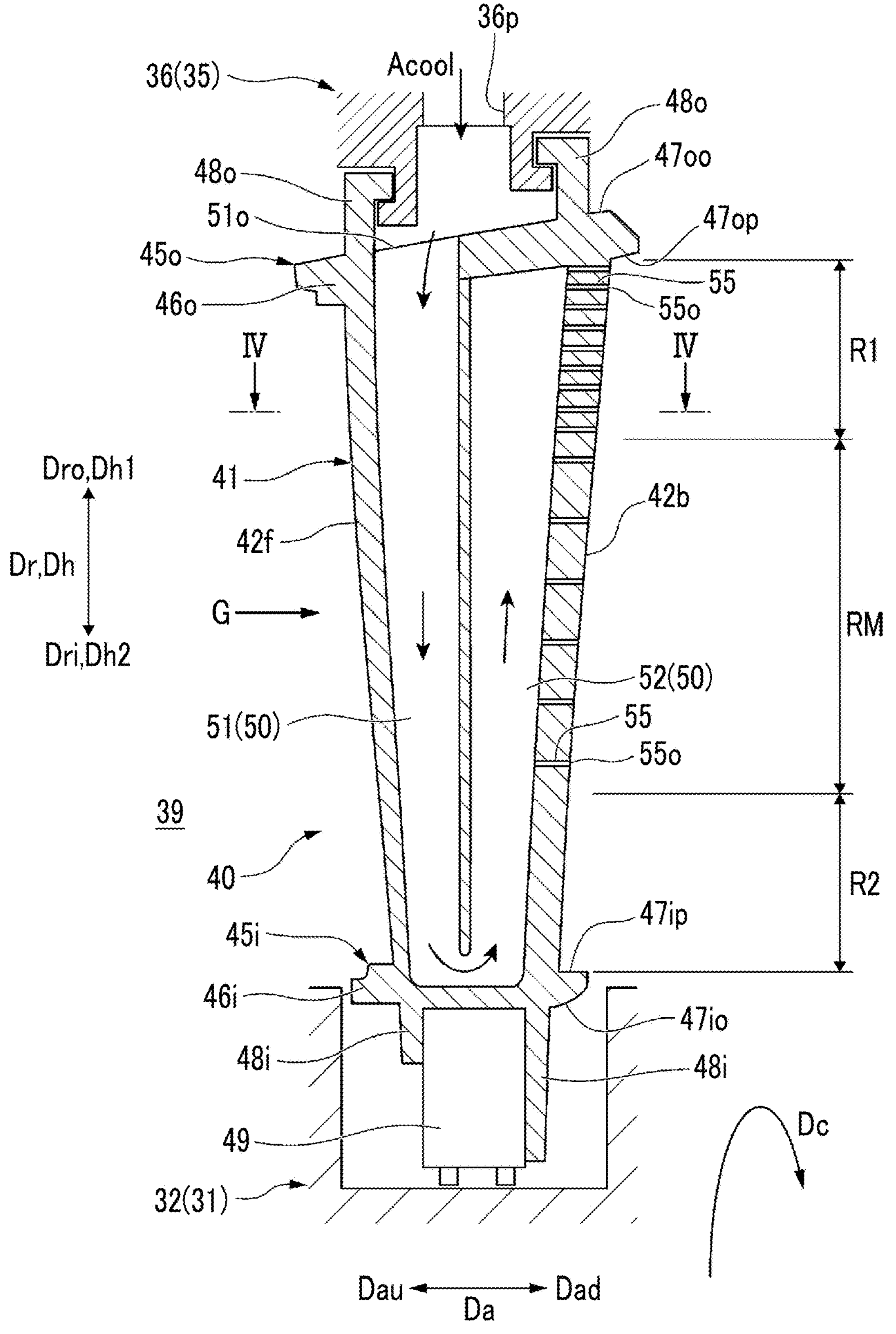
FIG. 3 is a cross-sectional view of a stator blade in the embodiment according to the present disclosure.

As illustrated in FIG. 3, a stator blade 40 according to the present embodiment includes a blade body 41, an outer shroud 45*o*, an inner shroud 45*i*, and a seal device 49. A shape of a cross section of the blade body 41 has a blade shape, and the blade body 41 extends in a blade height direction Dh having a direction component perpendicular to the cross section. The outer shroud 45*o* is provided in an end of a blade height first side Dh1 which is one side in the blade height direction Dh in the blade body 41. The inner shroud 45*i* is provided in an end of a blade height second side Dh2 which is the other side in the blade height direction Dh in the blade body 41. The blade body 41, the inner shroud 45*i*, and the outer shroud 45*o* are integrally formed by casting or the like. The seal device 49 is provided on the blade height second side Dh2 of the inner shroud 45*i*.

The blade height direction Dh is the radial direction Dr in a state where the stator blade 40 is attached to the turbine casing 35 (refer to FIG. 2). In addition, the blade height first side Dh1 which is one side in the blade height direction Dh is the radial outer side Dro, and the blade height second side Dh2 which is the other side in the blade height direction Dh is the radial inner side Dri. Therefore, the inner shroud 45*i* is provided on the radial inner side Dri of the blade body 41, and the outer shroud 45*o* is provided on the radial outer side Dro of the blade body 41. Therefore, in the present embodiment, in some cases, the blade height direction Dh may be referred to as the radial direction Dr, the blade height first side Dh1 may be referred to as the radial outer side Dro, and the blade height second side Dh2 may be referred to as the radial inner side Dri.

The seal device 49 seals a space between the stator blade 40 and the rotor shaft 32 in the radial direction Dr. The outer shroud 45*o* defines a portion of an edge on the radial outer side Dr of the combustion gas flow path 39 having an annular shape together with the ring segment 37. In addition, the inner shroud 45*i* defines a portion of an edge on the radial inner side Dri of the combustion gas flow path 39 having an annular shape.

The outer shroud 45*o* includes an outer shroud body 46*o* and a hook portion 48*o*. The outer shroud body 46*o* is a plate-shaped member spreading in a direction including a direction component in a direction perpendicular to the radial direction Dr which is the blade height direction Dh. The outer shroud body 46*o* includes a gas path surface 47*op* and a counter-gas path surface 47*oo*. The gas path surface 47*op* is a surface facing the radial inner side Dri which is the blade height second side Dh2, and the counter-gas path surface 47*oo* is a surface facing the radial outer side Dro which is the blade height first side Dh1. The counter-gas path surface 47*oo* is in a back-to-back relationship with the gas path surface 47*op*. The hook portion 48*o* is provided on the counter-gas path surface 47*oo* of the outer shroud body 46*o*. The hook portion 48*o* is configured to be attachable to the turbine casing body 36.

The inner shroud 45*i* includes an inner shroud body 46*i* and a seal attachment portion 48*i*. The inner shroud body 46*i* is a plate-shaped member spreading in a direction including a direction component in a direction perpendicular to the radial direction Dr which is the blade height direction Dh. The inner shroud body 46*i* includes a gas path surface 47*ip* and a counter-gas path surface 47*io*. The gas path surface 47*ip* is a surface in contact with the combustion gas G, and faces the radial outer side Dro which is the blade height first side Dh1. The counter-gas path surface 47*io* is a surface facing the radial inner side Dri which is the blade height second side Dh2. The counter-gas path surface 47*io* is in a back-to-back relationship with the gas path surface 47*ip*. The seal attachment portion 48*i* is provided on the counter-gas path surface 47*io* of the inner shroud body 46*i*. The seal attachment portion 48*i* is configured to hold the seal device 49.

Figure 4:
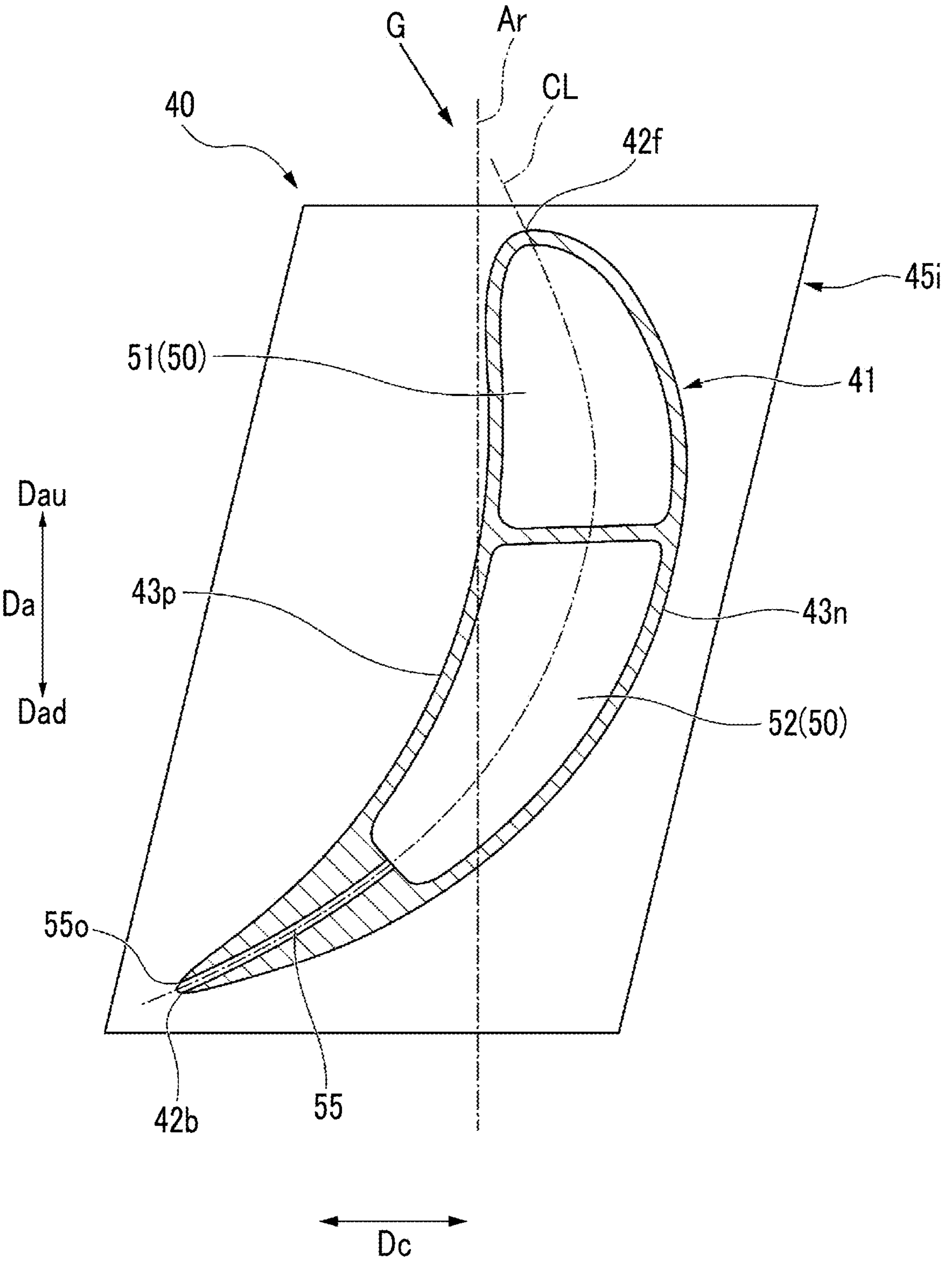
FIG. 4 is a cross-sectional view taken along line IV-IV in FIG. 3.

As illustrated in FIG. 4, a blade surface which is an outer surface of the blade body 41 includes a leading edge 42*f*, a trailing edge 42*b*, a suction surface 43*n* which is a protruding surface, and a pressure surface 43*p* which is a recessed surface. The leading edge 42*f* and the trailing edge 42*b* exist in a connection portion between the suction surface 43*n* and the pressure surface 43*p*. All of the leading edge 42*f*, the trailing edge 42*b*, the suction surface 43*n*, and the pressure surface 43*p* extend in the radial direction Dr which is the blade height direction Dh. The leading edge 42*f* is located on the axial upstream side Dau with respect to the trailing edge 42*b* in a state where the stator blade 40 is attached to the turbine casing 35.

The blade body 41 is disposed inside the combustion gas flow path 39 through which the combustion gas G passes. The blade body 41 includes a plurality of blade air passages 50 extending in the blade height direction Dh inside the blade body 41, and a plurality of rear end air passages 55 aligned in the blade height direction Dh inside the blade body 41.

The plurality of blade air passages 50 formed inside the blade body 41 are aligned along a camber line CL of the blade body 41. Here, in the plurality of blade air passages 50, the blade air passage 50 closest to the axial upstream side Dau, that is, the blade air passage 50 on the side closest to the leading edge 42*f* is set as a front blade air passage 51, and the blade air passage 50 closest to the axial downstream side Dad is set as a rear blade air passage 52. In the plurality of blade air passages 50, the blade air passages 50 adjacent to each other in the plurality of blade air passages 50 communicate with each other in one end out of the blade height first side Dh1 and the blade height second side Dh2 such that a passage forms one serpentine passage meandering in the blade height direction Dh. The stator blade 40 of the present embodiment includes two blade air passages 50 having an even number. Therefore, in the present embodiment, the front blade air passage 51 and the rear blade air passage 52 are adjacent to each other.

The front blade air passage 51 includes an inlet opening 51*o* which is open on the counter-gas path surface 47*oo* of the outer shroud 45*o*. The front blade air passage 51 extends from the inlet opening 51*o* to the blade height second side Dh2. A casing air passage 36*p* through which the cooling air Acool can be circulated is formed in the turbine casing body 36. The cooling air Acool flowing out from the casing air passage 36*p* of the turbine casing body 36 flows into the front blade air passage 51 from the inlet opening 51*o* of the front blade air passage 51. The cooling air Acool convectively cools a periphery of the front blade air passage 51 in the blade body 41 in a process of flowing inside the front blade air passage 51. The front blade air passage 51 and the rear blade air passage 52 communicate with each other in mutual ends of the blade height second side Dh2. Therefore, the cooling air Acool passing through the front blade air passage 51 flows into the rear blade air passage 52 from the end of the blade height second side Dh2 of the rear blade air passage 52, and flows to the blade height first side Dh1 inside the rear blade air passage 52. The cooling air Acool convectively cools a periphery of the rear blade air passage 52 in the blade body 41 in a process of flowing inside the rear blade air passage 52.

The plurality of rear end air passage 55 extend from the rear blade air passage 52 toward the trailing edge 42*b*. The plurality of rear end air passages 55 each include a trailing edge opening 55*o* which is open in the trailing edge 42*b*. The cooling air Acool flowing inside the rear blade air passage 52 flows into the plurality of rear end air passages 55. The cooling air Acool convectively cools a periphery of the rear end air passages 55 in the blade body 41 in a process of flowing through the rear end air passages 55. The cooling air Acool passing through the rear end air passages 55 is ejected into the combustion gas flow path 39 from the trailing edge opening 55*o*.

Here, in the trailing edge 42*b*, a region within 25% of a total length in the blade height direction Dh in of the trailing edge 42*b* from an end of the blade height first side Dh1 to the blade height second side Dh2 of the trailing edge 42*b* is set as a first side region R1. In the trailing edge 42*b*, a region within 25% of the total length in the blade height direction Dh of the trailing edge 42*b* from an end of the blade height second side Dh2 to the blade height first side Dh1 of the trailing edge 42*b* is set as a second side region R2. Furthermore, in the trailing edge 42*b*, a region between the first side region R1 and the second side region R2 in the blade height direction Dh is set as an intermediate region RM. In addition, an opening area of the trailing edge openings 55*o* in the plurality of rear end air passages 55 in the blade height direction Dh per unit length of the trailing edge 42*b* is defined as an opening ratio.

The opening ratio of the trailing edge openings 55*o* in the present embodiment is higher in the first side region R1 than in the second side region R2. The opening areas of the trailing edge openings 55*o* of each of the plurality of rear end air passages 55 in the present embodiment are the same as each other. Therefore, in the present embodiment, the number of trailing edge openings 55*o* is larger in the first side region R1 than in the second side region R2. Specifically, the number of the trailing edge openings 55*o* of the second side region R2 is 0 (that is, the opening ratio of the second side region R2 is 0). Meanwhile, the plurality of trailing edge openings 55*o* are formed in the intermediate region RM and the first side region R1. The number of the trailing edge openings 55*o* of the first side region R1 is three times or more the number of the trailing edge openings 55*o* of the intermediate region RM. Thus, the opening ratio of the trailing edge opening 55*o* of the first side region R1 is three times or more the opening ratio of the trailing edge opening 55*o* of the intermediate region RM.

In recent years, in order to improve the performance of the gas turbine, a method for increasing the blade height of the blade body 41, in other words, a method for increasing the length of the blade body 41 in the radial direction Dr has been studied. When the length of the blade body 41 in the radial direction Dr increases, a force received by the blade body 41 from the combustion gas G increases, and a moment in which an end of the radial inner side Dri of the blade body 41 tends to turn to the axial downstream side Dad around an end of the radial outer side Dro of the blade body 41 increases. When the moment increases in this way, it is necessary to increase strength of a portion on the radial outer side Dro around the trailing edge 42*b* of the blade body 41. On the other hand, even when the moment increases, the portion on the radial inner side Dri of the blade body 41 is located on a side a free end of the stator blade 40. Therefore, it is not necessary to increase the strength of this portion.

Therefore, in the present embodiment, the opening ratio of the second side region R2 is decreased to suppress a usage amount of cooling air Acool. In contrast, the opening ratio of the first side region R1 is increased to improve cooling performance of the first side region R1. In this manner, degradation of the strength around the first side region R1 is suppressed. Therefore, in the present embodiment, the stator blade 40 is effectively cooled, and the usage amount of the cooling air Acool can be suppressed while improved durability of the stator blade 40 can be achieved. In particular, in the present embodiment, the opening ratio of the second side region R2 is set to 0, the usage amount of the cooling air Acool is suppressed, the opening ratio of the first side region R1 is set to three times or more the opening ratio of the intermediate region RM, and the cooling performance of the first side region R1 is improved. Therefore, the cooling air Acool can extremely effectively cool the stator blade 40.

Here, as the method for increasing the opening ratio, there are a method for increasing the opening area of the trailing edge opening 55*o* and a method for increasing the number of trailing edge openings 55*o*. As in the present embodiment, when the number of the plurality of trailing edge openings 55*o* in the first side region R1 is increased to narrow a pitch of the plurality of trailing edge openings 55*o* in the first side region R1, the periphery of the first side region R1 can be uniformly cooled, compared to the method for increasing the opening area of the trailing edge opening 55*o*.

As in the present embodiment, when the number of the plurality of blade air passages 50 is an even number, the cooling air Acool flows to the blade height first side Dh1 inside the rear blade air passage 52 which is the blade air passage 50 on a side closest to the trailing edge 42*b*. Therefore, inside the rear blade air passage 52, a temperature of the cooling air Acool flowing through a portion of the blade height first side Dh1 is higher than a temperature of the cooling air Acool flowing through a portion of the blade height second side Dh2. When the periphery of the first side region R1 is cooled by the high-temperature cooling air Acool, it is necessary to increase the opening ratio of the trailing edge opening 55*o*, compared to when the periphery of the first side region R1 is cooled by the low-temperature cooling air Acool. Therefore, from this viewpoint, particularly when the plurality of blade air passages 50 have an even number, the opening ratio of the trailing edge opening 55*o* in the plurality of rear end air passages 55 needs to be higher in the first side region R1 than in the second side region R2.

[Modification Example of Stator Blade]

The stator blade 40 according to the above-described embodiment is the stator blade 40 forming the stator blade row 38 closest to the axial downstream side Dad in the plurality of stator blade rows 38. However, the stator blade according to the present disclosure may be the stator blade forming the stator blade row 38 excluding the stator blade row 38 closest to the axial downstream side Dad in the plurality of stator blade rows 38. For example, the stator blade according to the present disclosure may be the stator blade in which only one row from the stator blade row 38 closest to the axial downstream side Dad in the plurality of stator blade rows 38 forms the stator blade row 38 on the axial upstream side Dau.

The stator blade 40 according to the above-described embodiment includes two blade air passages 50 having an even number. However, the stator blade according to the present disclosure may include three or more blade air passages 50. However, it is preferable that the number of the blade air passages 50 is an even number.

In the above-described embodiment, the opening ratio of the second side region R2 is 0. However, as long as the opening ratio of the first side region R1 is higher than the opening ratio of the second side region R2, the opening ratio of the second side region R2 does not need to be 0.

In the above-described embodiment, the number of trailing edge openings 55*o* is increased to increase the opening ratio. However, the opening area of the trailing edge opening 55*o* may be increased to increase the opening ratio. However, when the opening ratio is increased, as described above, it is preferable to increase the number of trailing edge openings 55*o* from a viewpoint of uniform cooling.

In the above-described embodiment, in the trailing edge 42*b*, the region within 25% of the length in the blade height direction Dh in the trailing edge 42*b* from the end of the blade height first side Dh1 to the blade height second side Dh2 of the trailing edge 42*b* is set as the first side region R1. In addition, in the above-described embodiment, in the trailing edge 42*b*, the region within 25% of the length in the blade height direction Dh in the trailing edge 42*b* from the end of the blade height second side Dh2 of the trailing edge 42*b* to the blade height first side Dh1 is set as the second side region R2. However, a value of 25% may be appropriately changed within a range of 15% to 40%, depending on the temperature of the combustion gas G around the stator blade 40, the temperature of the cooling air Acool flowing into the stator blade 40, the number of the blade air passages 50 of the stator blade 40, and the position of the stator blade row 38 including the stator blades 40. For example, in the trailing edge 42*b*, a region within 30% of the length in the blade height direction Dh in the trailing edge 42*b* from the end of the blade height first side Dh1 to the blade height second side Dh2 of the trailing edge 42*b* may be set as the first side region R1, and in the trailing edge 42*b*, a region within 20% of the length in the blade height direction Dh in the trailing edge 42*b* from the end of the blade height second side Dh2 to the blade height first side Dh1 of the trailing edge 42*b* may be set as the second side region R2.

The present disclosure is not limited to the embodiments described above. Various additions, changes, replacements, or partial deletions can be made within the scope not departing from the conceptual idea and the concept of the present invention derived from the contents defined in the scope of the appended claims and the equivalent thereof.

[Additional Notes]

For example, the stator blade in the above-described embodiment and modification example is understood as follows.

(1) In the stator blade according to a first aspect, the stator blade 40 included in the gas turbine includes the blade body 41 having a blade shape in a cross section and extending in the blade height direction Dh having a direction component perpendicular to the cross section, the outer shroud 450 provided on the blade height first side Dh1 out of the blade height first side Dh1 and the blade height second side Dh2 of the blade body 41 in the blade height direction Dh, and configured to be attached to the turbine casing 35, the plurality of blade air passages 50 extending in the blade height direction Dh inside the blade body 41, and the plurality of rear end air passages 55 aligned in the blade height direction Dh. The blade body 41 has the leading edge 42*f* and the trailing edge 42*b* which extend in the blade height direction Dh. The plurality of blade air passages 50 are aligned from the side of the leading edge 42*f* toward the side of the trailing edge 42*b*. The front blade air passage 51 which is the blade air passage 50 on the side closest to the leading edge 42*f* in the plurality of blade air passages 50 has the inlet opening 510 into which the cooling air Acool can flow, in the end of the blade height first side Dh1 of the front blade air passage 51. In the plurality of blade air passages 50, the blade air passages 50 adjacent to each other in the plurality of blade air passages 50 communicate with each other in one end of the blade height first side Dh1 and an end of the blade height second side Dh2 such that a passage forms one serpentine passage meandering in the blade height direction Dh. The plurality of rear end air passages 55 have the trailing edge opening 55*o* extending toward the trailing edge 42*b* from the rear blade air passage 52 which is the blade air passage 50 on the side closest to the trailing edge 42*b* in the plurality of blade air passages 50, and which is open in the trailing edge 42*b*. A region including the end of the blade height first side Dh1 and not including the end of the blade height second side Dh2 in the trailing edge 42*b* extending in the blade height direction Dh is defined as the first side region R1. A region separated from the first side region R1 to the blade height second side Dh2 in the trailing edge 42*b* and including the end of the blade height second side Dh2 is defined as the second side region R2. The opening area of the trailing edge opening 55*o* in the plurality of rear end air passages 55 per unit length of the trailing edge 42*b* in the blade height direction Dh is defined as an opening ratio. In this case, the opening ratio of the trailing edge opening 55*o* in the plurality of rear end air passages 55 is higher in the first side region R1 than in the second side region R2.

In recent years, in order to improve the performance of the gas turbine, a method for increasing the blade height of the blade body 41, in other words, a method for increasing the length of the blade body 41 in the radial direction Dr has been studied. When the length of the blade body 41 in the radial direction Dr increases, a force received by the blade body 41 from the combustion gas G increases, and a moment in which an end of the radial inner side Dri of the blade body 41 tends to turn to the axial downstream side Dad around an end of the radial outer side Dro of the blade body 41 increases. When the moment increases in this way, it is necessary to increase strength of a portion on the radial outer side Dro around the trailing edge 42*b* of the blade body 41. On the other hand, even when the moment increases, the portion on the radial inner side Dri of the blade body 41 is located on a side a free end of the stator blade 40. Therefore, it is not necessary to increase the strength of this portion.

Therefore, in the present aspect, the opening ratio of the second side region R2 is decreased to suppress the usage amount of the cooling air Acool. In contrast, the opening ratio of the first side region R1 is increased to improve the cooling performance of the first side region R1. In this manner, degradation of the strength around the first side region R1 is suppressed. Therefore, in the present aspect, the stator blade 40 can be effectively cooled, and the usage amount of the cooling air Acool can be suppressed while improved durability of the stator blade 40 can be achieved.

(2) As the stator blade according to a second aspect, in the stator blade 40 according to the first aspect, the number of the plurality of trailing edge openings 55*o* is larger in the first side region R1 than in the second side region R2.

As a method for increasing the opening ratio, there are a method for increasing the opening area of the trailing edge opening 55*o* and a method for increasing the number of trailing edge openings 55*o*. As in the present aspect, when the number of the plurality of trailing edge openings 55*o* in the first side region R1 is increased to narrow a pitch of the plurality of trailing edge openings 55*o* in the first side region R1, the periphery of the first side region R1 can be uniformly cooled, compared to the method for increasing the opening area of the trailing edge opening 55*o*.

(3) As the stator blade according to a third aspect, in the stator blade 40 according to the first aspect or the second aspect, in the trailing edge 42*b*, the opening ratio of the intermediate region RM between the first side region R1 and the second side region R2 in the blade height direction Dh is higher than the opening ratio of the second side region R2, and is lower than the opening ratio of the first side region R1.

(4) As the stator blade according to a fourth aspect, in the stator blade 40 according to the third aspect, the opening ratio of the first side region R1 is three times or more the opening ratio of the intermediate region RM.

In the present aspect, the cooling performance around the first side region R1 in the blade body 41 can be improved.

(5) As the stator blade according to a fifth aspect, in the stator blade 40 according to any one of the first to fourth aspects, the opening ratio of the second side region R2 is 0.

In the present aspect, the usage amount of the cooling air Acool can be suppressed.

(6) As the stator blade according to a sixth aspect, in the stator blade 40 according to any one of the first to fifth aspects, in the trailing edge 42*b*, the first side region R1 is a region within 25% of the length in the blade height direction Dh in the trailing edge 42*b* from the end of the blade height first side Dh1 to the blade height second side Dh2 of the trailing edge 42*b*. In the trailing edge 42*b*, the second side region R2 is a region within 25% of the length in the blade height direction Dh in the trailing edge 42*b* from the end of the blade height second side Dh2 to the blade height first side Dh1 of the trailing edge 42*b*.

(7) As the stator blade according to a seventh aspect, in the stator blade 40 according to any one of the first to sixth aspects, the number of the plurality of blade air passages 50 is an even number.

In the plurality of blade air passages 50, the cooling air Acool flowing into the front blade air passage 51 from the inlet opening 51*o* of the front blade air passage 51 which is the blade air passage 50 on the side closest to the leading edge 42*f* flows to the blade height second side Dh2 inside the front blade air passage 51. When the number of the plurality of blade air passages 50 is an even number, the cooling air Acool flows to the blade height first side Dh1 inside the rear blade air passage 52 which is the blade air passage 50 on the side closest to the trailing edge 42*b*. Therefore, inside the rear blade air passage 52, a temperature of the cooling air Acool flowing through a portion of the blade height first side Dh1 is higher than a temperature of the cooling air Acool flowing through a portion of the blade height second side Dh2. When the periphery of the first side region R1 is cooled by the high-temperature cooling air Acool, it is necessary to increase the opening ratio of the trailing edge opening 55*o*, compared to when the periphery of the first side region R1 is cooled by the low-temperature cooling air Acool. Therefore, from this viewpoint, particularly when the plurality of blade air passages 50 have an even number, the opening ratio of the trailing edge opening 55*o* in the plurality of rear end air passages 55 needs to be higher in the first side region R1 than in the second side region R2.

(8) As the stator blade according to an eighth aspect, in the stator blade 40 according to any one of the first to sixth aspects, the number of the plurality of blade air passages 50 is two.

For example, the gas turbine in the above-described embodiment is understood as follows.

(9) According to a ninth aspect, there is provided the gas turbine including the turbine rotor 31 rotatable around the axis Ar, the turbine casing 35 that covers the outer peripheral side of the turbine rotor 31, and the plurality of stator blade rows 38 aligned in the axial direction Da in which the axis Ar extends and attached to the inner peripheral side of the turbine casing 35.

All of the plurality of stator blade rows 38 include the plurality of stator blades 40 aligned in the circumferential direction De with respect to the axis Ar. In the plurality of stator blade rows 38, each of the plurality of stator blades 40 of the final stage stator blade row 38 which is the stator blade row 38 closest to the axial downstream side Dad out of the axial upstream side Dau and the axial downstream side Dad in the axial direction Da is the stator blade 40 in any one of the first to eighth aspects. Each of the plurality of stator blades 40 of the final stage stator blade row 38 is attached to the turbine casing 35 such that the blade height direction Dh is the radial direction Dr with respect to the axis Ar, the blade height first side Dh1 is the radial outer side Dro out of the radial inner side Dri and the radial outer side Dro in the radial direction Dr, and a side on which the trailing edge 42*b* with respect to the leading edge 42*f* exists is the axial downstream side Dad.

INDUSTRIAL APPLICABILITY

According to one aspect of the present disclosure, a stator blade is effectively cooled with cooling air, and a usage amount of the cooling air can be suppressed while improved durability of the stator blade can be achieved.

REFERENCE SIGNS LIST

1: gas turbine
2: gas turbine rotor
5: gas turbine casing

6: intermediate casing
10: compressor
11: compressor rotor
12: rotor shaft
13: rotor blade row
15: compressor casing
18: stator blade row
20: combustor
21: burner
22: transition piece (or combustion tube)
30: turbine
31: turbine rotor
32: rotor shaft
33: rotor blade row
35: turbine casing
36: turbine casing body
36*p*: casing air passage
37: ring segment
38: stator blade row
39: combustion gas flow path
40: stator blade
41: blade body
42*f*: leading edge
42*b*: trailing edge
43*n*: suction surface
43*p*: pressure surface
45*o*: outer shroud
46*o*: outer shroud body
47*op*: gas path surface
47*oo*: counter-gas path surface
48*o*: hook portion
45*i*: inner shroud
46*i*: inner shroud body
47*ip*: gas path surface
47*io*: counter-gas path surface
48*i*: seal attachment portion
49: seal device
50: blade air passage
51: front blade air passage
51*o*: inlet opening
52: rear blade air passage
55: rear end air passage
550: trailing edge opening
A: outside air
Acom: compressed air
Acool: cooling air
G: combustion gas
F: fuel
CL: camber line
Ar: axis
Da: axial direction
Dau: axial upstream side
Dad: axial downstream side
Dc: circumferential direction
Dr: radial direction
Dri: radial inner side
Dro: radial outer side
Dh: blade height direction
Dh1: blade height first side
Dh2: blade height second side
R1: first side region
R2: second side region
RM: intermediate region

The invention claimed is:

1. A stator blade included in a gas turbine, comprising:

a blade body having a blade shape in a cross section and extending in a blade height direction having a direction component perpendicular to the cross section, the blade body having a blade height extending in a blade height direction from a blade height first side to a blade height second side;

an outer shroud on the blade height first side of the blade body, and configured to be attached to a turbine casing;

a plurality of blade air passages extending in the blade height direction inside the blade body; and a plurality of rear end air passages aligned along the blade height direction, wherein the blade body has a leading edge and a trailing edge which each extend in the blade height direction, wherein the plurality of blade air passages are aligned from a side of the leading edge toward a side of the trailing edge, wherein a front blade air passage on a side closest to the leading edge in the plurality of blade air passages has an inlet opening into which cooling air is to flow, the inlet opening being located in an end of the blade height first side of the front blade air passage, wherein the blade air passages adjacent to each other in the plurality of blade air passages communicate with each other in one of a first end of the blade height first side and a second end of the blade height second side to form a serpentine passage meandering in the blade height direction, wherein each of the plurality of rear end air passages has a trailing edge opening, and extends toward the trailing edge from a rear blade air passage closest to the trailing edge among the plurality of blade air passages, the trailing edge opening being open in the trailing edge, wherein a region of the trailing edge including the end of the blade height first side and not including the end of the blade height second side and extending in the blade height direction is defined as a first side region, a region of the trailing edge separated from the first side region and extending to the blade height second side and including the end of the blade height second side is defined as a second side region, and an opening area of the trailing edge openings of the plurality of rear end air passages per unit length of the trailing edge in the blade height direction is defined as an opening ratio, the opening ratio of the second side region being 0, wherein the opening ratio of the trailing edge openings of the plurality of rear end air passages in the first side region is greater than the opening ratio of the trailing edge openings of the plurality of rear end air passages in the second side region, and wherein the opening ratio of the trailing edge openings of the plurality of rear end air passages in an intermediate region between the first side region and the second side region in the blade height direction is greater than the opening ratio of the trailing edge openings of the plurality of rear end air passages in the second side region, and the opening ratio of the trailing edge openings of the plurality of rear end air passages in the intermediate region is less than the opening ratio of the trailing edge openings of the plurality of rear end air passages in the first side region.

2. The stator blade according to claim 1, wherein a quantity of the trailing edge openings is larger in the first side region than in the second side region.

3. The stator blade according to claim 1, wherein the opening ratio of the first side region is at least three times the opening ratio of the intermediate region.

4. The stator blade according to claim 1, wherein the first side region is a region within 25% of a total length in the blade height direction of the trailing edge from the end of the blade height first side to the blade height second side in the blade height direction of the trailing edge, and wherein the second side region is a region within 25% of the total length in the blade height direction of the trailing edge from the end of the blade height second side to the blade height first side of the trailing edge.

5. The stator blade according to claim 1, wherein a quantity of the plurality of blade air passages is an even number.

6. The stator blade according to claim 1, wherein the quantity of the plurality of blade air passages is two.

7. A gas turbine comprising:

a turbine rotor rotatable around an axis;

a turbine casing covering an outer peripheral side of the turbine rotor; and a plurality of stator blade rows aligned along an axial direction in which the axis extends, the plurality of stator blade rows being attached to an inner peripheral side of the turbine casing, wherein all of the plurality of stator blade rows have a plurality of stator blades aligned in a circumferential direction with respect to the axis, wherein the plurality of stator blade rows includes a final stage stator blade row located farthest downstream in the axial direction among the plurality of stator blade rows, each of the plurality of stator blades of the final stage stator blade row being configured as the stator blade according to claim 1, and each of the plurality of stator blades of the final stage stator blade row is attached to the turbine casing such that the blade height direction is a radial direction with respect to the axis, the blade height first side being a radial outer side with respect to the axis, and the trailing edge being located on the axial downstream side in the axial direction.

* * * * *